Figure 2C:
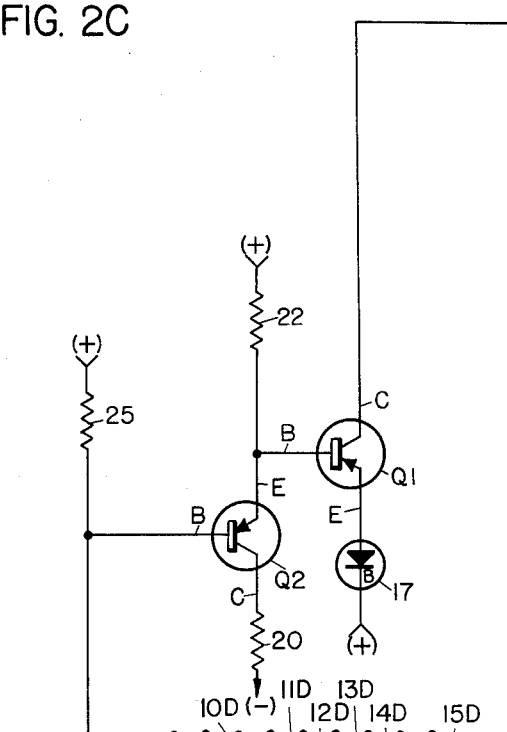

March 15, 1966    N. B. COLEY    3,241,131
CONTROL SYSTEM FOR POSTING INDICATORS
Filed Feb. 14, 1962      5 Sheets-Sheet 1
CODE TABLE
| INDICATOR POSITION DISPLAYS | CONTROL BUSES | | | | | |
|---|---|---|---|---|---|---|
| | 1 | 2 | 3 | 4 | 5 | 6 |
| 1 | O | + | O | O | + | + |
| 2 | + | O | + | O | + | O |
| 3 | O | + | + | O | O | + |
| 4 | + | O | + | + | O | O |
| 5 | O | + | O | + | O | + |
| 6 | O | + | O | + | + | O |
| 7 | + | O | O | O | + | + |
| 8 | O | + | + | O | + | O |
| 9 | + | O | + | O | O | + |
| 0 | + | O | O | + | + | O |
| □ | O | + | + | + | O | O |
| N | + | O | O | + | O | + |
FIG. IC
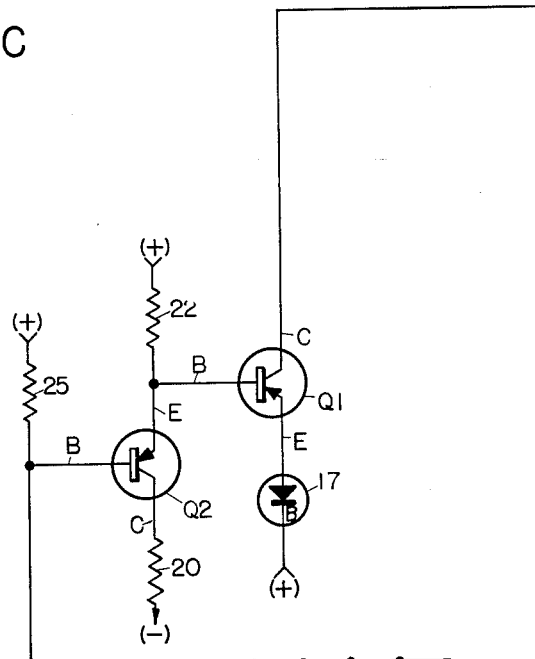
FIG. IA
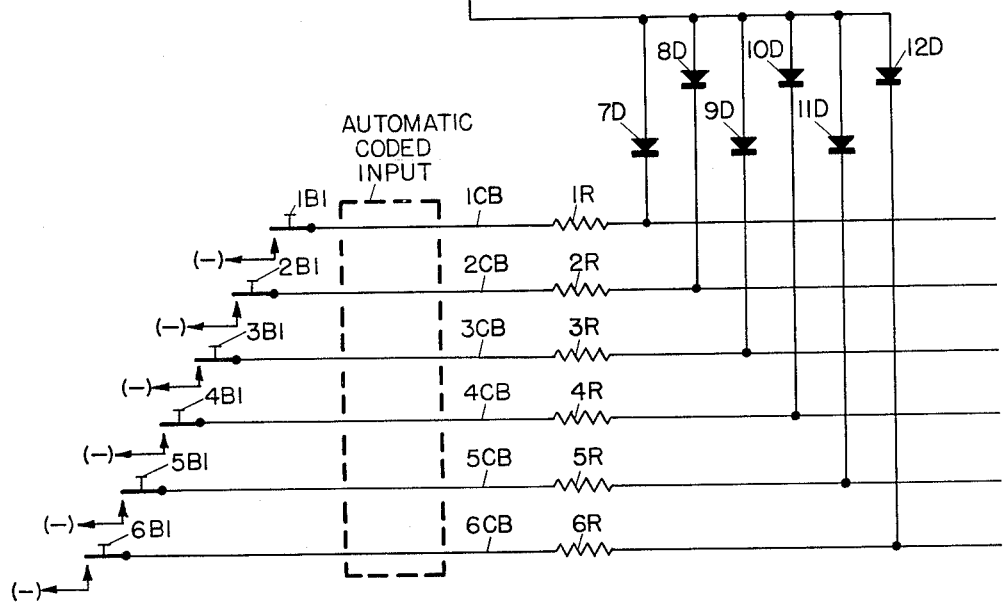
INVENTOR.
N.B. COLEY
BY
*Forest B. Hitchcock*
HIS ATTORNEY

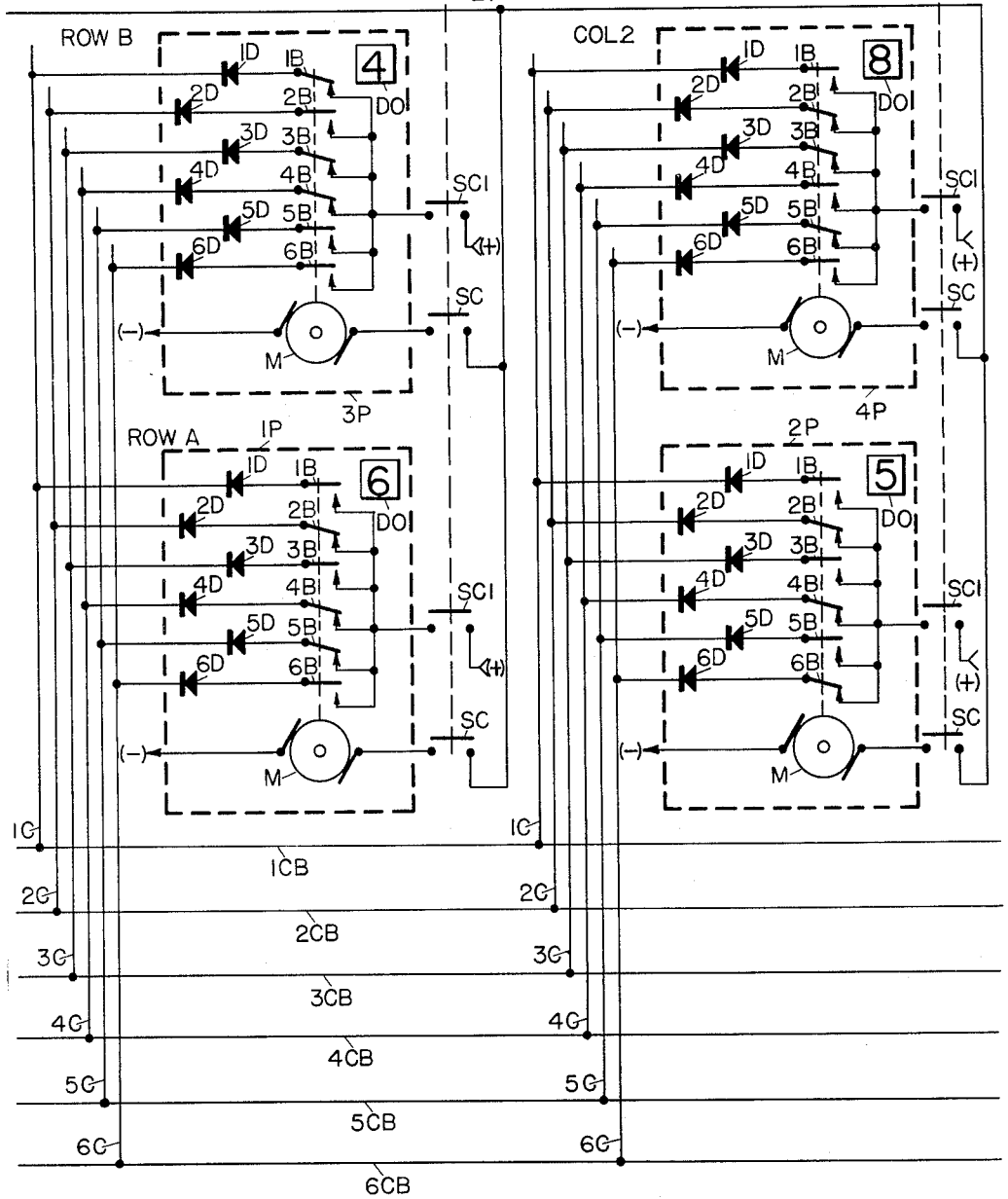

March 15, 1966  N. B. COLEY  3,241,131

CONTROL SYSTEM FOR POSTING INDICATORS

Filed Feb. 14, 1962  5 Sheets-Sheet 3

CODE TABLE

| DISPLAY INDICATOR POSITION NUMBER | CONTROL BUSES | | | | | | | | | |
|---|---|---|---|---|---|---|---|---|---|---|
| | 1 | 2 | 3 | 4 | 5 | 6 | 7 | 8 | 9 | 10 |
| 1 | + | 0 | 0 | 0 | 0 | 0 | 0 | 0 | 0 | 0 |
| 2 | 0 | + | 0 | 0 | 0 | 0 | 0 | 0 | 0 | 0 |
| 3 | 0 | 0 | + | 0 | 0 | 0 | 0 | 0 | 0 | 0 |
| 4 | 0 | 0 | 0 | + | 0 | 0 | 0 | 0 | 0 | 0 |
| 5 | 0 | 0 | 0 | 0 | + | 0 | 0 | 0 | 0 | 0 |
| 6 | 0 | 0 | 0 | 0 | 0 | + | 0 | 0 | 0 | 0 |
| 7 | 0 | 0 | 0 | 0 | 0 | 0 | + | 0 | 0 | 0 |
| 8 | 0 | 0 | 0 | 0 | 0 | 0 | 0 | + | 0 | 0 |
| 9 | 0 | 0 | 0 | 0 | 0 | 0 | 0 | 0 | + | 0 |
| 0 | 0 | 0 | 0 | 0 | 0 | 0 | 0 | 0 | 0 | + |

INVENTOR.
N.B. COLEY
BY
HIS ATTORNEY

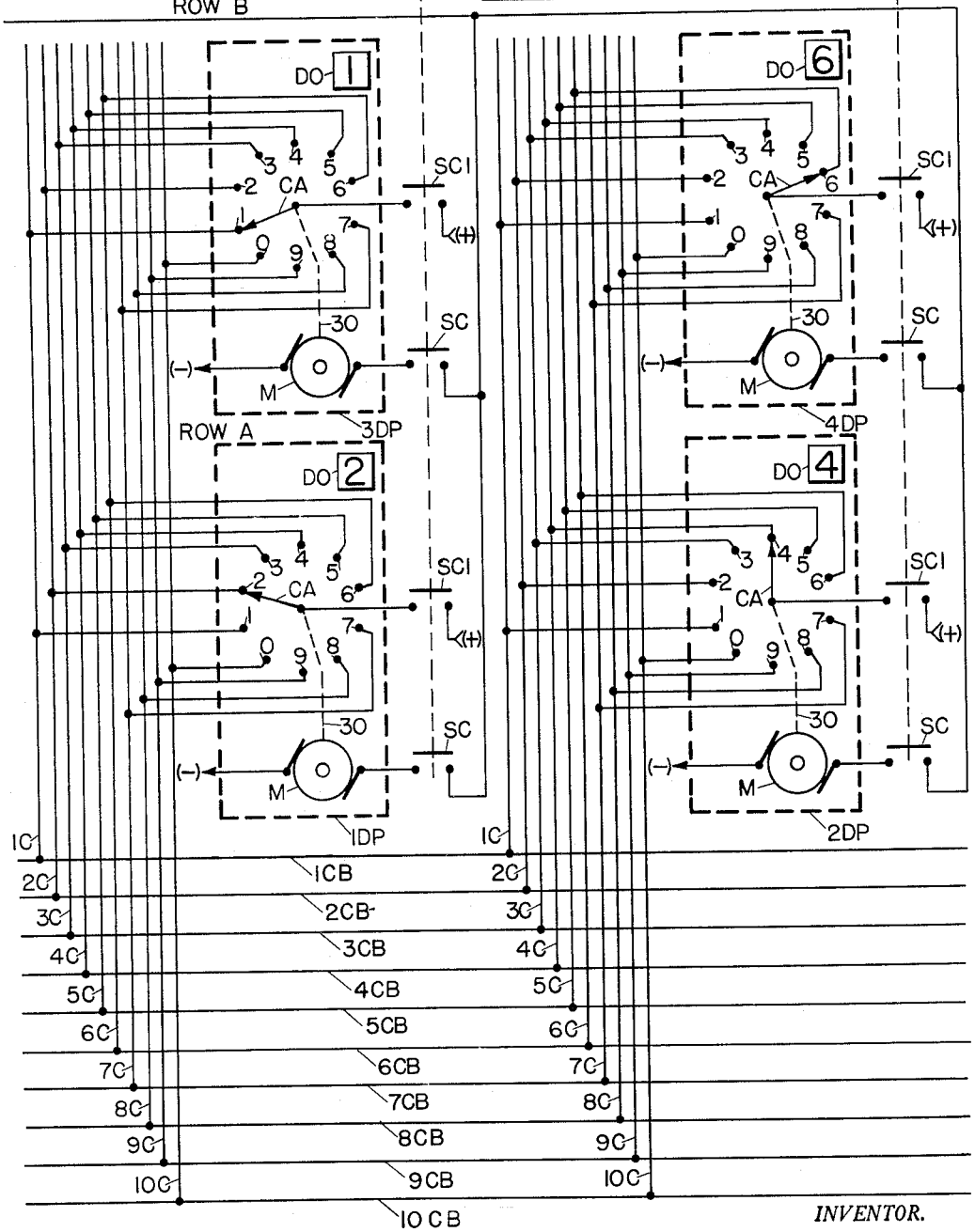

March 15, 1966 N. B. COLEY 3,241,131
CONTROL SYSTEM FOR POSTING INDICATORS
Filed Feb. 14, 1962 5 Sheets-Sheet 5

INVENTOR.
N.B. COLEY
BY
*Forest B. Hitchcock*
HIS ATTORNEY

United States Patent Office 3,241,131
Patented Mar. 15, 1966

3,241,131
CONTROL SYSTEM FOR POSTING INDICATORS
Nelson B. Coley, Honeoye Falls, N.Y., assignor to
General Signal Corporation
Filed Feb. 14, 1962, Ser. No. 173,278
5 Claims. (Cl. 340—324)

This invention relates to a control system for posting indicators, and, more particularly, pertains to such a control system for operating a posting indicator selected from a plurality of posting indicators to a particular display position.

It has been the practice in constructing posting indicators to provide a number of contacts which are operatively controlled in different combinations to opened and closed positions by some form of a driving means such as a motor or electromagnet. In this connection, the driving means may be located in the enclosure with the contacts or external thereof.

To control such posting indicators to a particular display position, it has been found convenient to selectively apply energy over control buses connected to the contacts for controlling operation of the driving means. This general type of operation has been common with respect to each of the posting indicator types generally referred to as digital and binary type posting indicators, the difference here being, respectively, that a control bus is required for each contact of either a digital or binary type posting indicator, but where the number of contacts for a digital posting indicator is equal to the number of display positions, while the number of contacts for a binary type posting indicator is less than the number of display positions.

In operating either a digital or binary type posting indicator, it is typical to cause the driving means to be energized from the existing display position through each intermediate display position by insuring that at least one closed contact is connected to an energized control bus, but associating all closed contacts with deenergized buses in the desired display position. In such operation, a motor employed as a driving means may be energized directly through the closed contacts associated with energized buses or indirectly by rendering its energization circuit complete through a front or back contact of a relay controlled through the operated contacts. It has been the experience, especially in binary type posting indicators, that improper operation frequently occurs inasmuch as contacts become improperly closed due to faulty operation or the presence of interfering conducting material such that the desired display position is not properly reached. Many attempts to overcome this problem have been made, one such attempt being to improve the material used for contacts.

Generally speaking, and without attempting to define the exact scope of this invention, it is proposed to provide a control system for posting indicators which overcomes the disadvantages of prior control systems by employing a single control circuit which is rendered operative according to at least one control bus being energized for directly controlling the operation of a motor driving means, but being rendered inoperative when all contacts of that indicator connected to energized control buses are operated to closed positions at the same time. Moreover, such a control circuit may be used with a plurality of posting indicators where each may be selected for individual operation. Both digital and binary type posting indicators may be operated by the novel control system of this invention, the only requirement for each being that at least one contact of the indicator is closed during operation between each intermediate position through which the indicator must operate to reach the desired position.

Thus, one object of this invention is to provide a control system for posting indicators having a control circuit which is operative in response to selected control bus energization for permitting operation of a posting indicator and is rendered inoperative when all energized control buses correspond to respective closed contacts of the posting indicator being operated.

Another object of this invention is to provide a control system for posting indicators having a single control circuit operative in response to control bus energization for causing operation of a posting indicator selected from a plurality of posting indicators only according to particular contacts thereof being open.

Another object of this invention is to provide a control system for posting indicators having a plurality of posting indicators similarly connected through changeable contacts thereof to a common set of control buses where a control biasing circuit for each control bus is completed through a closed contact of a selected posting indicator.

Other objects, purposes and characteristic features of the present invention will be in part obvious from the accompanying drawings and in part pointed out as the description of the invention progresses.

In describing the invention in detail, reference will be made to the accompanying drawings, in which like reference character designate corresponding parts throughout the several views, and in which:

FIGS. 1A and 1B when placed with FIG. 1B to the right of FIG. 1A illustrate the control system of this invention for a number of binary type posting indicators.

Figure 2A:
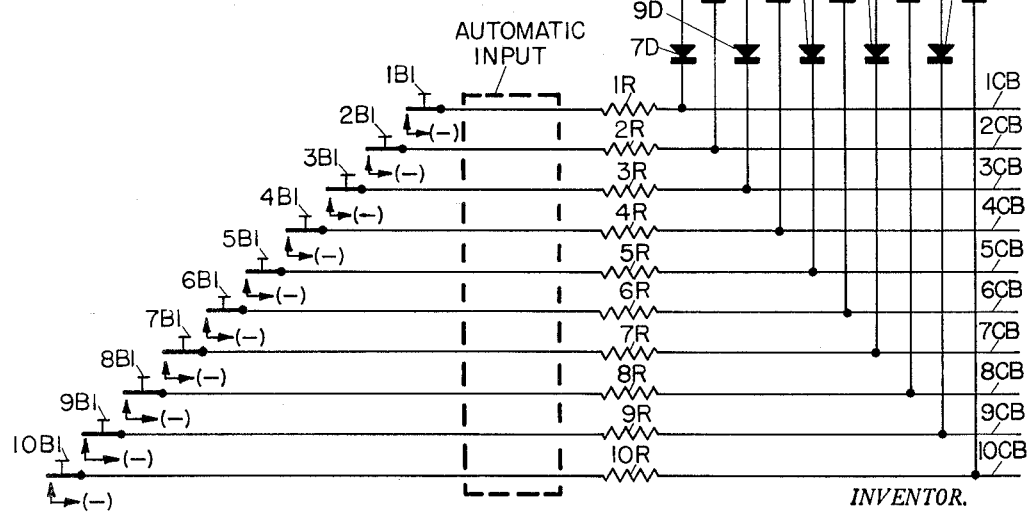
Figure 3:
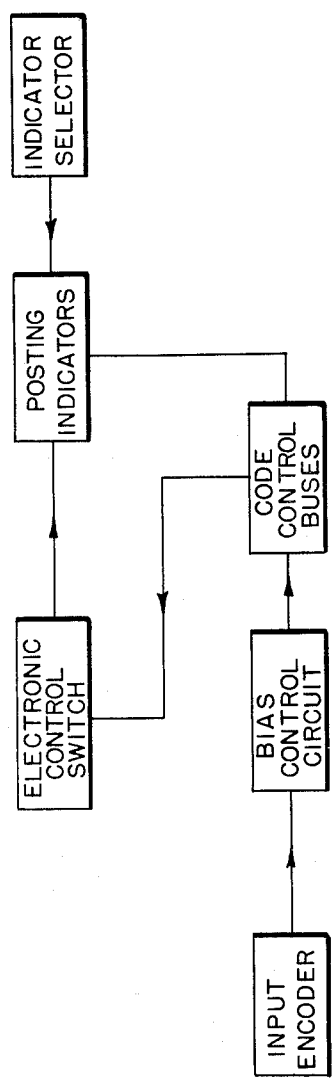

FIG. 1C is a Code Table representing the control bus energization required for operating the posting indicators of FIGS. 1A and 1B to their different positions;

FIGS. 2A and 2B when placed with FIG. 2B to the right of FIG. 2A illustrate the control system of this invention for a number of digital type posting indicators;

FIG. 2C is a Code Table representing the control bus energization required for operating the posting indicators of FIGS. 2A and 2B to their different positions; and FIG. 3 is a block diagram illustrating the general organization according to the present invention.

For the purpose of simplifying the illustrations and facilitating in the explanation, the various parts and circuits constituting the embodiment of the invention as utilized with digital and binary type posting indicators have been shown diagrammatically and certain conventional illustrations have been employed. The drawings have been made more for the purpose of making it easy to understand the principles and mode of operation rather than with the idea of illustrating the specific construction and arrangement of parts that would be employed in practice. The symbols (+) and (—) are employed as shown to illustrate the positive and negative terminals, respectively, of suitable batteries or other sources of direct current, and the circuits with which these symbols are used always have current flowing in the same direction.

The disclosures shown in the drawings have been prepared to show that the principles of control for posting indicator operation disclosed herein may be employed with either a digital or binary type posting indicator system organization irrespective of whether such system receives posting information in the form of selected control bus energization locally or over some form of communication system. For this reason, some of the functions required for the posting control have been shown diagrammatically as accomplished manually, while it is also indicated that such functions may be accomplished automatically either by local control or by remote control where a suitable form of communication system is employed. The general manner in which these characteristic control functions are accomplished will be explained more in detail in the following description.

Structure of FIGS. 1A and 1B

Referring to FIGS. 1A and 1B, a plurality of posting indicators indicated as 1P, 2P, 3P, and 4P are shown as arranged in columns and rows. For convenience, the columns have been numbered and the rows have been given letters. Each of the posting indicators 1P, 2P, 3P, and 4P may be of any suitable binary type posting indicator, but for convenience are assumed to be of the general type shown in the pending application of W. D. Maynard, Serial No. 763,569 filed September 26, 1958, which has resulted in Patent No. 3,142,053.

In the above mentioned Maynard application Serial No. 763,569, which has resulted in Patent No. 3,142,053 a posting indicator structure is shown and described as including a commutator and contact arrangement where the commutator arrangement is driven so as to position the contacts relative to commutator segments in different open and closed code combinations through suitable reduction gearing by a motor which causes a display tape to be operatively moved passed a display opening. The posting indicator is further shown and described as having a physical arrangement between the commutator segments and contacts such that eight contacts may be employed with the commutator segments to provide for thirty-six different display positions, whereas only six contacts may be employed with the commutator segments to provide for only twelve different display positions. In brief, the code combinations to which the contacts are operated for the different display positions are so chosen that operation of the posting indicator requires energization of three control buses for each of the code combinations selected for the twelve different display positions while leaving deenergized the remaining three control buses. This is shown in the Code Table of FIG. 1C.

Referring to the Code Table of FIG. 1C, it is noted that the (+) symbol is used to indicate the control buses for the desired display position that must be energized to operate the posting indicator to such display position, while the (0) symbol is used to indicate the control buses for the display positions which are left deenergized. When control buses are energized in a particular code combination, the posting indicator which is being operated continues in such operation until the contacts associated with those energized control buses are closed, while the contacts associated with those deenergized control buses are opened. Thus, in effect, the symbols (+) in the Code Table of FIG. 1C also indicate that the corresponding contacts of a posting indicator for the corresponding display position are closed.

In addition, the twelve different positions of the posting indicator have been represented in the Code Table of FIG. 1C as the digits 0–9, a blank symbol and the letter N. It should be understood, however, that for the different positions of the posting indicators, any letter, digit or other symbol may be used on the display tape of each posting indicator as may be desired.

Referring to FIG. 1B, each of the posting indicators 1P, 2P, 3P, and 4P is diagrammatically illustrated as having a motor M, six contact brushes 1B through 6B, six diodes 1D through 6D and a display opening DO. One terminal of the motor M is connected to (−), while the other terminal thereof is selectively connected through a switching contact SC to the control circuit shown in FIG. 1A. One side of each of the contact brushes 1B–6B is connected in common with the others and further connected selectively through a switching contact SC1 to (+). The other side of each control brush 1B–6B is connected through one of the diodes 1D–6D to a column bus indicated as 1C through 6C.

The column buses 1C through 6C for each of the columns 1 and 2 are connected respectively, to control buses 1CB through 6CB in a manner to cause each similarly positioned brush contact for all posting indicators 1P through 4P to be connected to the same control buses. For example, brush contact 1B for each posting indicator 1P through 4P is connected in respective columns 1 and 2 through a column bus 1C to control bus 1CB. In this connection, brush contact 1B for all posting indicators in the same column is connected to the same column bus such as brush contact 1B for posting indicators 1P and 3P being connected to column bus 1C for column 1.

Referring now to FIG. 1A, push buttons 1B1, 2B1, 3B1, 4B1, 5B1, and 6B1 are shown as being connected to respective control buses 1CB, 2CB, 3CB, 4CB, 5CB, and 6CB so as to selectively apply negative (−) energy to such control buses in each of the code combinations indicated in the Code Table of FIG. 1C. Alternately, such negative (−) energy may be applied automatically by a suitable communication system in the form of a coded input as indicated by the dashed line rectangle encompassing a portion of the control buses 1CB–6CB.

Irrespective of the type of control employed to apply energy to the control buses 1CB–6CB in a coded combination, it is applied through a resistor connected in each control bus and to the brush contacts of each indicator through respective diodes 1D–6D and column buses 1C–6C. Resistors 1R, 2R, 3R, 4R, 5R, and 6R are, respectively, connected in the control buses 1CB, 2CB, 3CB, 4CB, 5CB, and 6CB.

Inasmuch as negative (−) energy is applied to three control buses in a code combination and three of the brush contacts 1B–6B for each posting indicator are closed for each display position, it is apparent that feed-around circuits could be established through the common connection of the brush contacts so as to apply negative (−) energy on a control bus not originally energized. The diodes 1D–6D included with each posting indicator 1P–4P serve the function of preventing the establishment of such feed-around circuits.

The control circuit to which each motor M is selectively connected through its associated switching contact SC includes two P-N-P type transistors designated Q1 and Q2. More particularly, transistor Q1 includes terminals collector C, emitter E and base B. The collector C is connected to each of the switching contacts SC through a contact thereof, while emitter E is connected to positive (+) energy through a breakdown diode 17. Transistor Q2 also includes terminals collector C, emitter E and base B. Collector C is connected through a resistor 20, to a negative (−) energy, while emitter E is connected to positive (+) energy through a resistor 22. A biasing circuit for base B of transistor Q1 is taken from the lower side of the resistor 22.

Biasing circuits for base B of transistor Q2 is established to the control buses 1CB–6CB where each includes a resistor 25 having one side thereof connected to positive (+) energy and the opposite side thereof connected to base B of transistor Q2 as well as each of the control buses 1CB–6CB through respective diodes 7D, 8D, 9D, 10D, 11D, and 12D. The function of each biasing circuit is to place the base of transistor Q2 at a negative (−) potential so as to permit energization thereof only when an associated control bus is energized from the input with negative (−) energy while the brush contact for the operating posting indicator is opened. In the event that the brush contact therefor is closed, the biasing circuit is rendered ineffective to cause energization of transistor Q2 and thus the energization of transistor Q1.

Operation of FIGS. 1A and 1B

By referring to the Code Table of FIG. 1C, it will be recalled that for any position of any particular posting indicator, certain control buses must be energized in a code combination. When a selected posting indicator has assumed such position, its brush contacts corresponding to the energized control buses are then closed. Thus, by observing the opened and closed positions of the brush contacts associated with each of the posting indicators, it is possible to determine its existing display position. This is indicated by the symbol in the display opening DO shown in the upper right-hand corner of each of the indicators 1P–4P. For example, posting indicator 1P shows the symbol six in its display opening DO, while brush contacts 2B, 4B, and 5B are in closed positions. Referring to the Code Table of FIG. 1C, it is noted, for the symbol six, that control buses 2, 4, and 5 must be energized to operate indicator 1P to display the symbol six.

To illustrate the operation of a selected posting indicator by the control system of this invention, let it be assumed that it is desired to operate posting indicator 1P from the display position six to the display position three. This requires that control buses 2CB, 3CB, and 6CB be energized with negative (—) energy by either manual or automatic control, while the switching control indicated at 27 is effective either manually or automatically to close the switching contacts SC and SC1 for posting indicator 1P.

When the above conditions are accomplished, three circuits are completed over the control buses 2CB, 3CB, and 6CB, two of which are initially effective to bias the base B of transistor Q2 to a negative (—) potential. For control bus 2CB, a circuit is established from (—), through button 2B1, through resistor 2R, over control bus 2CB, over column bus 2C, through diode 2D for indicator 1P, through brush contact 2B for indicator 1P, through switching contact SC1, to (+). A voltage drop appearing across resistor 2R back-biases diode 8D to prevent current flow therethrough. For each of the control buses 3CB and 6CB however, a biasing circuit is completed to place a negative (—) potential on base B of the transistor Q2 inasmuch as the corresponding brush contacts 3B and 6B of indicator 1P are now open. For control bus 3CB, the biasing circuit extends from (—), through button 3B1, over control bus 3CB, through resistor 3R, through diode 9D, through resistor 25 causes its lower side to be at a negative (—) potential which is applied to the base B of transistor Q2. A similar circuit may be traced over control bus 6CB. During the operation of posting indicator 1P from display position 6 to display position 3, at least one biasing circuit is established in each position through which it is operated excepting position 3 to place base B of transistor Q2 at a negative (—) potential.

When base B of transistor Q2 is placed at a negative (—) potential and for the duration thereof, transistor Q2 is energized with current flow being established from (—) through resistor 20, through transistor Q2 from its collector C to emitter E through base B thereof, through resistor 22, to (+). A voltage drop occurs across resistor 22 which places its lower side at a negative (—) potential which is applied to base B of transistor Q1. Transistor Q1 is thus energized with current flow being established from (—), through motor M for posting indicator 1P, through the closed switching contacts SC, through transistor Q1 from collector C to emitter E through base B thereof, through breakdown diode 17, to (+). In this operation, breakdown diode 17 is merely provided to establish a proper operating voltage on emitter E, but breakdown diode 17 may be eliminated from the circuit if otherwise proper operating potentials can be obtained with a regular diode being included for biasing purposes.

As long as transistor Q1 is maintained energized, current flows through the path established therethrough and a positive (+) potential is applied one side of motor M included with posting indicator 1P through switching contact SC. With negative (—) energy connected to the opposite terminal of motor M energization thereof is maintained for controlling the positioning of commutator segments with the brush contacts 1B–6B of posting indicator 1P through the different code combinations until the code combination assigned to the symbol three is reached. In that combination, brush contacts 2B, 3B, and 6B are closed, while brush contacts 1B, 4B, and 5B are opened. Several circuits are then established from the negative (—) energy applied to control buses 2CB, 3CB, and 6CB similar to that described above for control bus 2CB. When established diodes 8B, 9D and 12D are back-biased according to respective voltage drops occurring across resistors 2R, 3R and 6R which cause the base B of transistor Q2 to be placed at substantially positive (+) energy.

Transistor Q2, having positive (+) energy applied to its base B, is deenergized which also causes positive (+) energy to be applied to base B of transistor Q1 thereby causing it to be deenergized. Motor M for posting indicator 1P has its energizing circuit thus disconnected which causes it to once again assume its static condition wherein the brush contacts 1B–6B are positioned in the code combination assigned to symbol 3.

Each of the other posting indicators 2P, 3P and 4P may be similarly controlled over the control buses 1CB–6CB with the aid of the single control circuit including transistors Q1 and Q2 merely by connecting the switching contacts SC and SC1 therefor either manually or automatically by switching control 27. Thus, posting indicators 1P–4P may be employed in a posting system to provide information singly or in combinations, i.e., each indicator may provide one digit of a multiple digit number.

*Structure of FIGS. 2A and 2B*

Referring in FIGS. 2A and 2B, a number of digital type posting indicators 1DP, 2DP, 3DP and 4DP are each diagrammatically illustrated to include a motor M, a multiple contact element and contact wiping arm arrangement, and a display opening DO. The posting indicators 1DP–4DP have been arranged in columns and rows where the columns have the numbers 1 and 2 while the rows have been given the letters A and B.

These posting indicators 1DP–4DP may be of any suitable type generally referred to as digital which includes a wiping arm which is positioned to be driven rotatably to make contact with ten separate contact elements. Posting indicators of this type are well known in the prior art and may take different forms. In each such form, however, it is to be understood that each of the ten contact elements is assumed to be employed with one of ten control buses. Each of the posting indicators 1DP–4DP is indicated to be a ten position posting indicator which is operated to its different positions by the motor M through suitable gearing as indicated by dashed lines 30 which operates the display element to move it past the display opening DO wherein the digits 0–9 are sequentially displayed. The contact wiping arm designated CA assumes a different position for each of the different display positions of the posting indicator. That is, the contact arm CA makes electrical contact with the contact element corresponding to an energized control bus which must be energized to operate a posting indicator to the desired display position. This will be more apparent by referring to the control bus energization Code Table of FIG. 2C.

Referring to FIG. 2C, the symbol (+) is used to indicate the control bus for each position that must be energized to operate a posting indicator to such display position, while the (0) symbol is used to indicate the control buses for each position that must be left deenergized. When a single control bus is energized for each of the number symbols represented in FIG. 2C, the selected positing indicator is operated continuously until the contact element electrically engages the rotating contact wiping arm CA. Thus, in effect, the symbol (+) in the Code Table of FIG. 2C indicates that contact element which electrically engages the contact wiping arm CA for each different display position.

Moreover, the ten different display positions of a posting indicator have been represented in the Code Table of FIG. 2C as number symbols 0–9, and these number symbols may also be displayed by the posting indicator in corresponding number positions. It should be understood, however, that any other number, letter or other symbol may be used on the display element of the posting indicators for the different display positions as may be desired.

For each of the indicators 1DP–4DP, the motor M has one terminal thereof connected to negative (−) energy and its other terminal connected selectively to the collector circuit of transistor Q1 through switching contact SC. The contact wiping arm CA is connected selectively to positive (+) energy through switching contact SC1. The contact elements 0–9 are connected respectively to column bus 1C, 2C, 3C, etc.

As before, the column buses 1C, 2C, 3C, etc. for each of the columns 1 and 2 are connected respectively, to the control buses 1CB, 2CB, 3CB, etc. Use of the ten position digital type posting indicator requires the addition of four additional circuits including buses 7CB, 8CB, 9CB, and 10CB each of which is connected in the same manner as control buses 1CB–6CB. Negative (−) energy is applied to the control buses 1CB–10CB by means of buttons 1B1–10B1 or automatically by a suitable communication system as indicated by the dashed rectangle which encompasses a portion of the control buses 1CB–10CB. Each control bus includes a resistor connected therein as described above where included resistors 7R, 8R, 9R and 10R are associated with the added control buses 7CB–10CB.

A biasing circuit is connected from each control bus 1CB–10CB to the base B of transistor Q2 in the manner described above with diodes 13D, 14D, 15D, and 16D being employed respectively with the control buses 7CB–10CB. The function of each biasing circuit is to control energization of a motor through transistors Q1 and Q2 for a selected posting indicator until such time as the contacting wiping arm CA for that indicator is positioned to apply energy to the proper diode 7D–16D for rendering the biasing circuit ineffective.

*Operation of FIGS. 2A and 2B*

Each of the digital type posting indicators 1DP–4DP as illustrated includes a contast wiping arm CA normally positioned to be in electrical engagement with one of ten contact elements 0–9. More particularly, the contact wiping arms CA for the posting indicators 1DP–4DP are, respectively, in electrical engagement with contact elements 2, 4, 1, and 6 with similar number symbols being displayed in respective display openings DO.

To better illustrate how the control system of this invention may be utilized with digital type posting indicators, let it be assumed hat it is desired to operate indicator 1DP to the position where it displays the number symbol 8 in its display open DO. By referring to the Code Table of FIG. 2C, it is noted that negative (−) energy is required on control bus 8CB. Also, the switching contacts SC and SC1 for indicating 1DP are assumed to be operated to closed contact making positions either manually or automatically by the switching control 27.

When the above operations are effected, a circuit is completed over control bus 8CB which extends from (−), through closed button 8B1, through resistor 8R, over control bus 8CB, through diode 14D, through resistor 25, to (+). This biasing circuit is maintained for causing transistor Q2 to be energized as described above until such time as contact wiping arm CA for indicator 1DP is positioned to electrically engage contact element 8. In this position, positive (+) energy is supplied through switching contact SC1 and contact wiping arm CA to the control bus 8CB which causes diode 14D to be back biased. The biasing circuit is then rendered ineffective which causes substantially positive (+) energy to be placed on the base B of transistor Q2. Transistor Q1 which was maintained energized for supplying control energy to motor M is then deenergized to thus interrupt the energizing circuit for motor M. Contact wiping arm CA thus remains in electrical engagement with contact element 8 where the number symbol 8 is displayed in the display opening DO of indicator 1DP.

Each of the remaining indicators 2DP–4DP may be similarly operated to change their respective displays to any number display as desired. Also the displays of indicators 1DP–4DP may be used singly or in combination, as generally described above for displaying desired information.

The novel control circuit including transistors Q1 and Q2 has been employed with two forms of posting indicators, but it is to be understood that other forms of posting indicators may as well be operated to their different display positions by the control circuit herein. Moreover, it is contemplated that other electronic devices such as tubes, relays, and other forms of transistors may be employed in lieu of transistors Q1 and Q2 to accomplish the same function assigned thereto.

Having described a control system in relation to two different forms of posting indicators as a specific embodiment of the present invention, it is desired to be understood that this embodiment has been selected to facilitate in the disclosure of the invention rather than to limit the number of forms which it may assume; and, it is to be further understood that various modifications, adaptations and alterations may be applied to the specific embodiment shown to meet the requirements of practice without in any manner departing from the spirit or scope of the present invention.

What I claim is:

1. A control system for a posting indicator having a plurality of display positions and a plurality of changeable contacts operable by the indicator to distinctive combinations of open and closed positions for the several display positions comprising, control buses connected to the several contacts, input means for selectively energizing the several buses, switching means operable selectively to conducting and non-conducting conditions for permitting operation of said indicator only provided that said switching means is in said conducting condition, and control means for said switching means governed jointly by energization of said buses and by said contacts for rendering said switching means conductive in response to one degree of energization of any one of the buses when the associated indicator contact is open, said control means being effective to render said switching means non-conductive by providing a different degree of energization to said switching means from the buses responsive to said indicator contacts becoming closed for all buses that are energized by the input means, whereby the switching means stops the indicator when the indicator is operated to a position corresponding to the position called for by the selective energization of the buses by the input means.

2. The system as claimed in claim 1 in which said switching means includes at least one electronic device normally inactive but operable to couple control energy to said driving means, said switching means including a plurality of biasing circuits, one biasing circuit for electrically coupling each of said plurality of control buses to said electronic device, each said biasing circuit being effective in response to energization of its corresponding control bus to cause said electronic device to operate, said control means including a control circuit for each of said plurality of control buses separately operable responsive to the closure of the changeable contact of said posting indicator corresponding to its energized control bus for electrically decoupling the biasing circuit for that control bus from said electronic device.

3. The system according to claim 2 wherein each changeable contact in its closed position couples one source of energy to its control bus, said input means being effective to couple the opposite source of energy to each selected control bus, each control circuit including a resistive element connected in the corresponding control bus between the selective input to that control bus and the changeable contact of said plurality of changeable contacts, each said biasing circuit including a unidirectional device having one terminal thereof coupled to the corresponding control bus between the resistive element of the control circuit in the changeable contact of the posting indicator and having its other terminal coupled to a biasing terminal of said electronic device which is coupled to said one source of energy through a resistive element, whereby operation of said posting indicator to a desired position causes said one source of energy to be coupled through each changeable contact in its closed position and over the corresponding control bus to the one terminal of the unidirectional device of the biasing circuit corresponding to that control bus for decoupling said opposite source of energy from the biasing terminal of said electronic device.

4. The system as claimed in claim 3 in which said electronic device is a transistor having an emitter element, a collector element and a base element, said emitter element being coupled to one source of energy and said collector element being coupled through the driving means of said posting indicator to the other source of energy, said base element being coupled to said plurality of unidirectional devices, whereby the closure of all changeable contacts in the desired position to which the posting indicator is operated which correspond to energized control buses causes the one source of energy to be coupled to the base terminal of said transistor device for turning it off and interrupting the control energy to the driving means of the posting indicator.

5. A control system for a plurality of posting indicators, each indicator having a plurality of display positions and a plurality of changeable contacts operable by the associated indicator to distinctive combinations of opened and closed positions for the several display positions comprising, control buses connected to the respective contacts of each of the indicators for governing the operation of the posting indicators, input means for selectively energizing the control buses, switching means operable selectively to conducting and non-conducting conditions for permitting the operation of any selected one of the indicators only provided that the switching means is in said conducting condition, and control means for said switching means governed jointly by said buses and by said contacts for rendering said switching means conductive in response to one degree of energization of any one of said buses by said input means, said control means being effective to render said switching means non-conductive by providing a different degree of energization to said switching means from the buses responsive to the contacts of a selected indicator becoming closed for all buses that are energized by the input means, whereby the switching means stops any indicator that is selected for operation when such indicator is operated to a position corresponding to the position called for by the selective energization of the buses by the input means.

References Cited by the Examiner

UNITED STATES PATENTS

| | | | |
|---|---|---|---|
| 1,890,878 | 12/1932 | Haselton et al. | 340—154 |
| 2,727,222 | 12/1955 | Bush | 340—154 |
| 2,736,017 | 2/1956 | Marlowe et al. | 340—316 |
| 3,054,984 | 9/1962 | Wilcox | 340—154 |
| 3,054,993 | 9/1962 | Coley et al. | 340—32 X |

NEIL C. READ, *Primary Examiner.*